April 1, 1952     R. R. WHITEHILL     2,591,325
FLUID CLUTCH FOR HOISTING DRUMS

Filed July 19, 1948     2 SHEETS—SHEET 1

RALPH R. WHITEHILL
INVENTOR

ATTORNEY

April 1, 1952 R. R. WHITEHILL 2,591,325
FLUID CLUTCH FOR HOISTING DRUMS
Filed July 19, 1948 2 SHEETS—SHEET 2

RALPH R. WHITEHILL
INVENTOR

ATTORNEY

Patented Apr. 1, 1952

2,591,325

UNITED STATES PATENT OFFICE 2,591,325

FLUID CLUTCH FOR HOISTING DRUMS

Ralph R. Whitehill, Oildale, Calif.

Application July 19, 1948, Serial No. 39,419

2 Claims. (Cl. 192—85)

This invention relates to hydraulically actuated clutches of the internally expanding type, and particularly to a clutch destined to carry a load when operated in one rotational direction.

A purpose of the invention is to provide a clutch which is simple and inexpensive in construction, particularly when considered in relation to the load which it will transmit.

A purpose of the invention is to provide a clutch which is self-energizing to a degree which may be controlled by the proportioning of certain of its component parts.

A purpose of the invention is to provide a clutch in which substantially the entire inner surface of the clutch drum is effective gripping surface.

A purpose of the invention is to provide a clutch in which the space relation between the shoes and the friction drum may be adjusted with speed and accuracy and without risk of subsequent slippage.

A purpose of the invention is to provide a clutch in which a plurality of friction shoes are applied to a friction drum with exactly the same force.

A purpose of the invention is to provide a clutch so designed that warping of the friction drum under the pressure required to transmit heavy loads is reduced to the minimum or completely avoided.

A purpose of the invention is to provide a clutch of which all the component parts are readily accessible for inspection, adjustment and repair.

These and other advantages of the invention will be evident on inspection of the attached drawings and the following description thereof, in which Fig. 1 is an end elevation of a preferred form of the assembly, as viewed from the open end;

Figure 1:
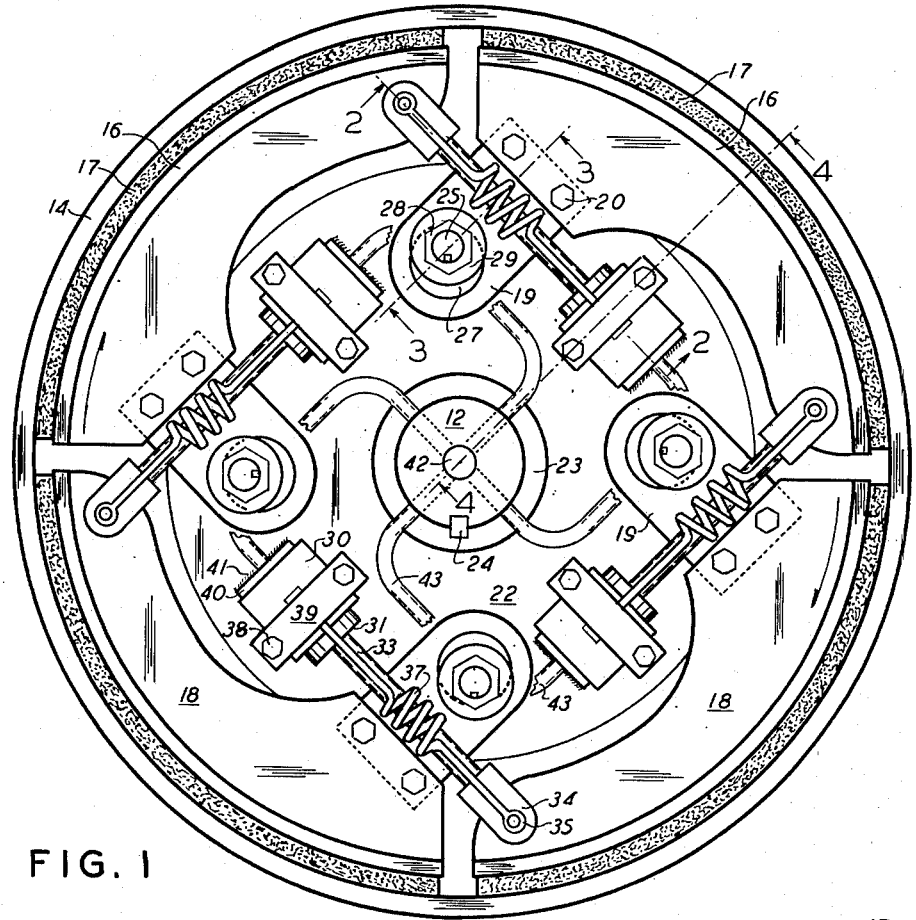

Referring first to Figs. 1 to 4 inclusive, a winding or hoisting drum 10 is provided with bearing bushings 11 allowing free rotation of the shaft 12 when the drum is stationary. The shaft in this form is assumed to be in substantially continuous rotation, being supported and driven in any convenient manner not shown, while the winding drum remains stationary unless and until the clutch is engaged.

The web 13 of a clutch drum 14 is attached to one end of the winding drum by a plurality of bolts or capscrews 15, or if preferred the clutch drum may be integral with the winding drum.

The clutch shoes 16—16, preferably four in number, are faced externally with brake block or other friction material 17 and are provided with internally projecting stiffening ribs 18.

The trailing end of each rib is provided with an offset tongue 19 (Fig. 3) which may be an integral part of the rib, the offset being formed by bending, or may be bolted to the rib as at 20 with the interposition of a spacer 21. The offset is necessary to permit the rib to clear the shoe-actuating rods later described.

Figure 4:
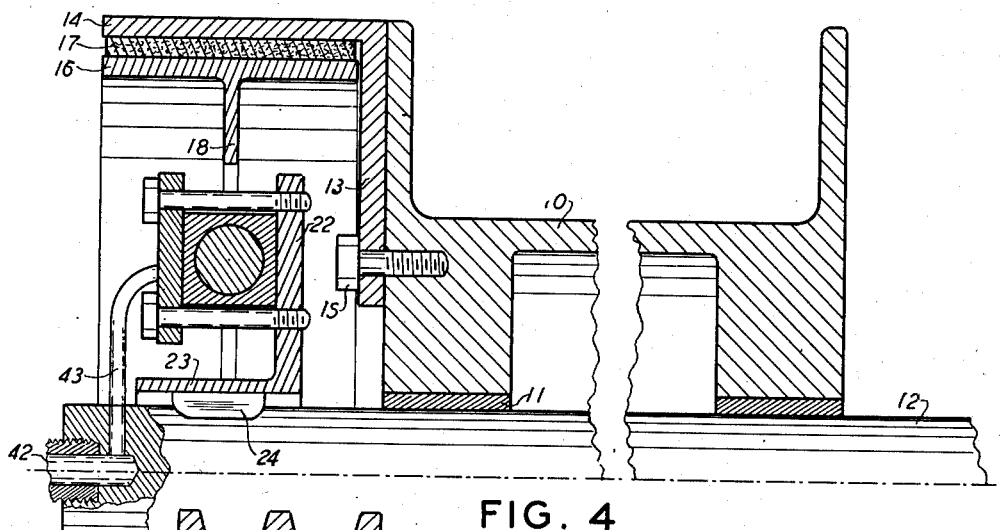
Fig. 4 is a longitudinal section through one-half the diameter of a winding drum provided with the preferred form of clutch, taken on the radius 4—4 of Fig. 1.

The trailing end of the shoe, from which the tongue is projected, is pivotally mounted on a shoe-driving plate 22 which, as shown in Figs. 1 and 4, is projected from a sleeve 23 which is keyed to and rotates with the shaft as at 24. A threaded stud 25 which may be prevented from rotating by tack-welding the head to the plate as at 26, carries an eccentric bushing 27 which is rotatable in a closely fitting corresponding opening through the tongue. Variation of the angular position of this bushing varies the spacing of the trailing end of shoe 16 from the inner face of clutch drum 14 and provides compensation for wear of lining 17. The bushing is locked in the adjusted position by a lock nut 28 bearing on a washer 29. The bushing should be slightly thicker than the metal of the tongue to afford a firm grip.

Figure 2:
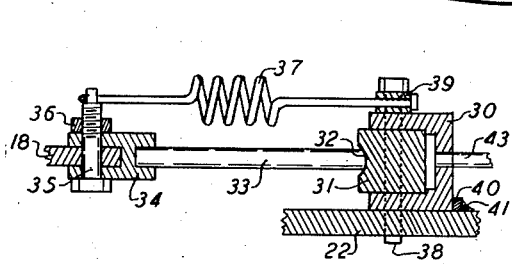
Fig. 2 is a longitudinal section, with certain parts shown in elevation, through the hydraulic shoe-actuating assemblies, as on the line 2—2 of Fig. 1.
Figure 3:
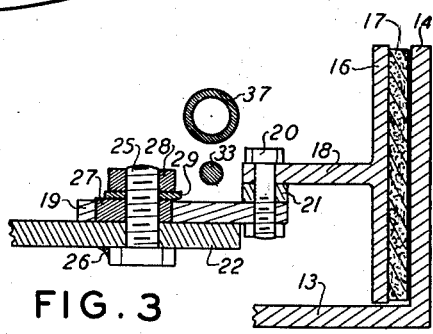
Fig. 3 is a section through one of the shoe adjusting assemblies, as on the line 3—3 of Fig. 1.

The advancing end of the shoe is forced into gripping contact with the inner face of the clutch drum by the hydraulic device illustrated in Figs. 1 and 2. A hydraulic cylinder 30 mounted on the driving plate 22 has a slidable piston 31, a rounded depression 32 being formed in the forward end of the piston to receive an end of a thrust rod 33. The other end of the thrust rod is provided with a clevis 34 and a clevis pin 35 retained by a nut 36.

Injection of hydraulic fluid under pressure back of the piston in cylinder 30 forces the shoe into engagement with the inner surface of the clutch drum, the shoe swinging around the pivot point which is the geometric center of eccentric bushing 27. A relatively strong coil spring 37, in tension, connects this end of the shoe with a convenient point on plate 22, drawing the shoe out of engagement with the clutch drum and returning the piston to the bottom of the cylinder when pressure is released.

As illustrated, the cylinders 30 may be clamped in contact with plate 22 by through-bolts 38—38 and a holding-down bar 39 and the terminals of spring 37 may be attached respectively to the end of the clevis pin and to this bar. When removably clamped to the driving plate in this manner, the cylinders may be retained against sliding by a back-up strip 40 welded to the plate as at 41. It is desirable that the cylinders should be removable though they may be welded to the plate if preferred.

Hydraulic pressure fluid to actuate the pistons is introduced at the end of the shaft into an axially disposed pocket 42 from which branch conduits 43 extend to any point in cylinders 30 rearwardly of piston 31.

Figure 5:
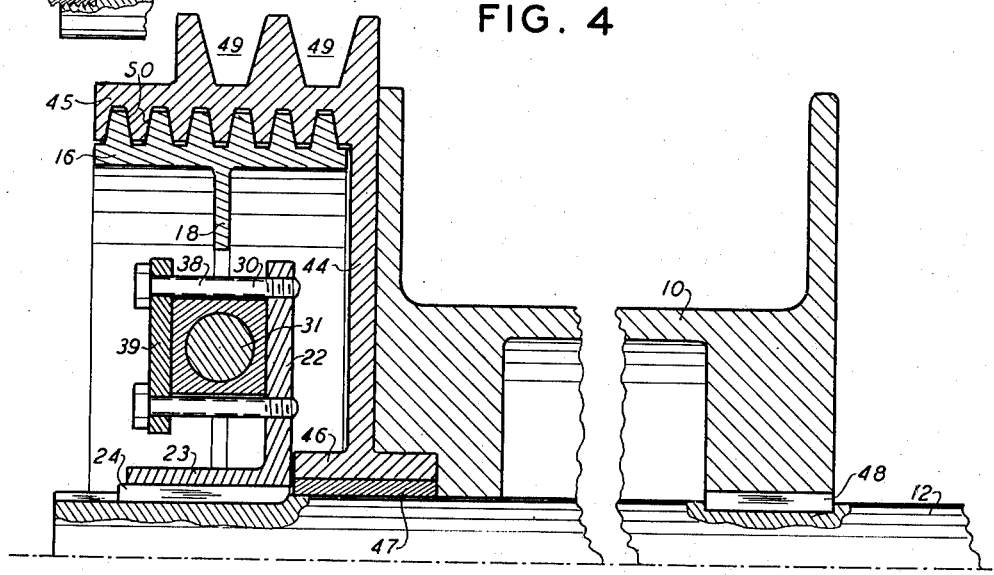
Fig. 5 is a similar half section through a modified arrangement of the clutch and winding drum.

The form of the structure illustrated in Fig. 5 varies from that above described in driving through the clutch drum, which floats on the shaft while the driving plate and the winding drum are keyed to the shaft.

Referring now to Fig. 5, the web 44 of clutch drum 45 is projected from a collar 46 surrounding the shaft and spaced from it by a bearing bushing 47, the clutch drum being thus freely rotatable around the shaft and within one end of the winding drum 10 which is keyed to the shaft as at 48. The driving plate collar 23 is also keyed to the shaft at 24 as in the form first described.

The exterior face of the clutch drum is provided with sprocket teeth or, as illustrated, with grooves 49—49 for V-belts, the drum being kept in constant rotation by belt or chain according to the load to be raised by the winding drum.

In this form, or in that already described, the inner face of the clutch drum and the outer faces of the shoes may be provided with mating serrated faces as at 50 in place of the friction facing 17 of Figs. 1 and 4.

It is essential to the best functioning of the described structure that all of the shoes should face in the same direction, that is, that all should be pivoted at the same end as regards direction of rotation. This arrangement avoids the distortion of the clutch drum which might result from unequal applications of pressure by the various shoes, and permits each shoe to have the maximum gripping effect.

When pivoted in the manner described, at the trailing end of each shoe, the pressure with which each shoe is applied to the drum by the hydraulic actuation (which may be assumed to be equal when the pressure fluid comes from a common source) is supplemented by an additional force due to the rocking of the shoe around the pivot point, which again will be substantially the same for all the shoes if the pivot points are identically located. The resultant total pressure of application, under load, will thus be at least approximately equal for all shoes, whereas in the prior art structures in which pairs of the shoes are pivoted at opposite ends, those of the shoes which are pivoted at the trailing end will be applied much more forcibly than those which are pivoted at the advancing end.

The degree of self-energization produced by the rocking of the shoe around its pivot may be varied by shifting the location of the pivot point, with regard also to the circumferential length of the shoe.

In the illustrated use of four shoes, in which the length of the individual shoe is slightly less than one-fourth the inner circumference of the clutch drum, the best location for the pivot point is at about one-half the radial distance from center of shaft to inner face of drum, and in a radius about 10° back from the radius intersecting the trailing end of the shoe face. This yields a clutch which depends largely on self-energization for its holding power but which may be feathered and which will not grab nor fail to disengage when the hydraulic pressure is withdrawn. In the use of three shoes, each occupying almost one-third of the drum circumference, the pivot point may lie directly between the trailing end of the face and the center of the shaft, while with the use of five shoes the pivot point may be retarded as much as 20° from the radius passing through the trailing end. In general terms, the degree of self-energization (and of force required for disengagement under load) is increased by advancing the arcuate position of the pivot point or by moving it toward the center of rotation of the clutch.

I claim as my invention:

1. Hoisting drum mechanism, comprising: a winding drum element and a driving plate element supported on a shaft, one of said elements being fixed to said shaft and the other of said elements being rotatable around said shaft; a clutch drum projected from the end of said winding drum and encircling said driving plate; a plurality of pivot studs projected from the face of said driving plate and equally spaced in a circle concentric with said shaft, said studs being located approximately midway between the center of said shaft and the inner face of said clutch drum; eccentric bushings surrounding said studs; a clutch shoe pivoted on each of said bushings, whereby manual adjustment of said bushings will adjust the effective radial positions of said clutch shoes; a number of hydraulic cylinders equal to the number of said shoes, removably attached to said driving plate; a piston in each said cylinder and a push rod having one end seated in a socket in the forward end of said piston and connecting said piston with the free end of one of said clutch shoes; means for controllably supplying hydraulic pressure fluid simultaneously to all of said cylinders from a common source, and resilient means urging the free end of each said shoe toward the cylinder to which it is connected and away from said clutch drum.

2. Structure substantially as described in claim 1, in which said hydraulic cylinders are removably clamped to said driving plate and abut against back-up strips immovably attached to said plate.

RALPH R. WHITEHILL.

REFERENCES CITED

The following references are of record in the file of this patent:

UNITED STATES PATENTS

| Number | Name | Date |
|---|---|---|
| 1,858,004 | Eason | May 10, 1932 |
| 1,972,829 | Oliver | Sept. 4, 1934 |
| 2,087,968 | Dodge | July 27, 1937 |
| 2,116,174 | Kay | May 3, 1938 |
| 2,159,137 | Doty | May 23, 1939 |
| 2,171,585 | Mattersdorf | Sept. 5, 1939 |
| 2,197,063 | Ashton | Apr. 16, 1940 |
| 2,265,694 | Lane et al. | Dec. 9, 1941 |
| 2,268,605 | Mattersdorf | Jan. 6, 1942 |
| 2,375,909 | Fawick | May 15, 1945 |